Aug. 9, 1927.

J. L. CHESNUTT 1,638,725

GLIDE CASTER

Filed April 24, 1925

Inventor
J. L. CHESNUTT
by Earl M. Sinclair Atty

Patented Aug. 9, 1927.

1,638,725

UNITED STATES PATENT OFFICE.

JOHN LOUCIEN CHESNUTT, OF MERCED, CALIFORNIA, ASSIGNOR TO WALTER RALEIGH DARNELL, OF LONG BEACH, CALIFORNIA.

GLIDE CASTER.

Application filed April 24, 1925. Serial No. 25,572.

The object of this invention is to provide an improved glide caster or sliding support for furniture which presents a considerable area to the floor surface and tends to remain at all times in full contact with such floor surface irrespective of any tilting of the load object.

A further object of this invention is to provide an improved glide caster having a cushion member provided with a shoe for contact with the surface of the floor and also with a ball-and-socket connecting means to the load object.

A further object of this invention is to provide an improved universal pivotal connecting means between a sliding caster and a load object.

A further object of this invention is to provide an improved cushioned caster including a cushion member formed with a plurality of apertures extending vertically therethrough and sealed to air-tight condition when in use.

A further object of this invention is to provide an improved glide caster having outstanding cushioning means tending to make the device noiseless when moved over a surface and also tending to avoid injury to the floor surface and also to the load object when said object is placed violently or carelessly upon the floor.

With these and other objects in view, my invention consists in the construction, arrangement and combination of elements hereinafter set forth, pointed out in the claims and illustrated by the accompanying drawing, in which—

Figure 1:
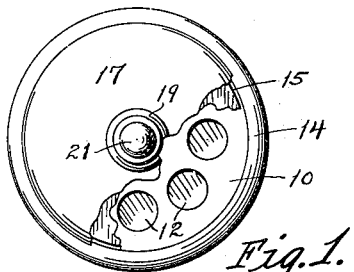
Figure 1 is a plan view illustrating one form of my improved caster, portions being broken away to reveal construction of underlying parts.
Figure 3:
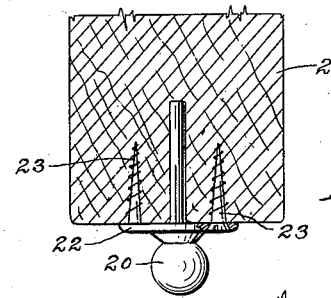
Figure 3 is an elevation, partly in section, showing a modified form of connecting means as associated with a load object.
Figure 2:
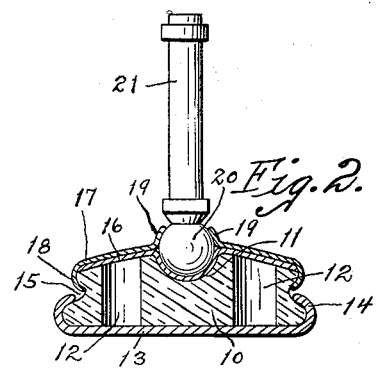
Figure 2 is a vertical section of the same.

In the construction of the device as shown a cushion member 10 is employed, which preferably is circular in plan and formed centrally of its upper surface with a concave depression or countersink 11. The cushion member may be formed of rubber or suitable composition having resilient qualities, and I prefer to form said member with a plurality of apertures 12 extending therethrough from top to bottom and arranged in a circular row concentric with the center. A shoe 13 may be formed of metal, glass or other hard material and is adapted to embrace the lower portion of the cushion 10, being formed with a peripheral flange 14 extending upwardly and inwardly on a curve and embracing a portion of said cushion. The bottom of the shoe 13 is flat and plane and the major portion thereof is adapted to contact with and slide on a floor surface. In the form shown in Figures 1, 2 and 6, the cushion 10 is formed with a peripheral groove 15 into which the peripheral flange 14 of the shoe is turned for the purpose of holding said shoe in place on the cushion. The connecting means is attached to the tip of the cushion member 10 and includes a base member 16 shaped to fit the top of said cushion and formed in its center with a concavo-convex portion or depression adapted to fit in the countersink 11 of said cushion. Overlying the base member 16 is a cap 17 having at its periphery a flange 18 turned downwardly and inwardly and engaging in the peripheral groove 15 of the cushion and adapted thereby to retain said cap and the other elements of the connecting means in place. The cap 17 is formed at its center with an opening surrounded by an upwardly and inwardly curved flange 19, said flange and the depression of the base member together forming a substantially spherical socket to receive a ball 20 which is free to oscillate to a limited extent in all directions in said socket to form a universal pivotal joint. The ball 20 may be formed on a stem such as 21, as shown in Figures 1 and 2, adapted to be received in and suitably secured to a load object such as a leg of furniture or the like. Or the fastening means applied to the ball may be a plate 22 adapted to contact with the lower surface of a load object such as 24, as in Figure 3, and be secured by screws 23 or the like; or the fastening means attached to said ball may itself be a screw such as 26 as in Figure 4, adapted to be seated in the load object. Whatever fastening means is employed in connection with the ball, it is obvious that there is a universal pivotal connection between said member and the cushion and shoe, the neck portion between the ball 20 and the fastening device extending through the opening in the cap and between the margins of the flange 19. This device is especially adapted for use on the legs of a straight or rigid chair, as contradistinguished from a swivel or rocking chair. It is common knowledge that such rigid chairs are exceedingly uncomfortable, especially when occupied for long at a time, and there is a tendency on the part of many users to tip back in them, elevating the two forward legs from the floor, to overcome or diminish the uncomfortable situation. The universal pivotal connection above described permits such tilting of the chair without tipping the portion of the caster which rests on the floor; in other words the fastening member may tilt with the chair leg while the cushion and shoe remain in normal horizontal position with the shoe in contact with the floor throughout nearly all of its surface. This prevents injury to the caster device and also to the furniture, as there is always a tendency in such tilting movement, especially when the chair is occupied by a heavy person, to either break the glide or caster or cause it to split out from or become detached from the furniture, or both. Likewise this arrangement tends to prevent marring of the floor surface, by contact of an edge of the shoe therewith in the action above described, or when the furniture is placed on the floor forcibly in an inclined position, or when it is caused to slide over a floor, most of which are more or less uneven.

The natural resiliency of the cushion 10 is increased, and the comfort to the occupant of the chair correspondingly increased, by the plurality of apertures 12, which are preferably sealed to air-tight or substantially air-tight condition by close engagement of the shoe 13 and base 16 respectively with the lower and upper surfaces of the cushion.

Figure 4:
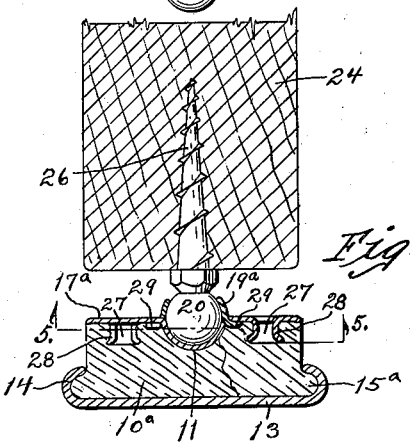
Figure 4 is a vertical section showing a modified means for connecting the cushion member to the connecting means and also showing a further modified form of connecting means as associated with a load object.

In Figure 4 I have shown a modified form of cushion 10ª the upper portion of which is of plane cylindrical shape and the lower portion is formed with a peripheral rib 15ª adapted to be engaged by the peripheral flange of the shoe 13, which is formed identically as before described. The cushion member 10ª is formed with a number of holes 27 in its upper surface, upon which a cap member 17ª rests, and said cap member is formed with downturned projections struck out from its surface and indicated at 28, which are adapted to be received within said holes 27 and expanded or forced apart at their lower ends against and in compressing relation to the material of the cushion member to prevent withdrawal of said projections and effectively rivet said cap member to the base member. The cap member 17ª is formed in its central portion with a concavo-convex depression fitting within a countersink in the center of the top of the cushion member 10ª, as before, to form part of a spherical socket for a ball 20. The upper part of the socket is formed by a separate socket member 19ª of substantially semi-spherical form and with an opening at its top for the neck of the ball; and on its lower margin said socket member is formed with teeth 29 adapted to project through holes in the cap member 17ª and be upset against the lower surface of said member, whereby the socket member is rigidly attached to the cap member after the ball is put in place. The cushion member 10ª may also be formed with the circular row of cushioning apertures 12ª extending therethrough as shown in Figure 5.

Figure 6:
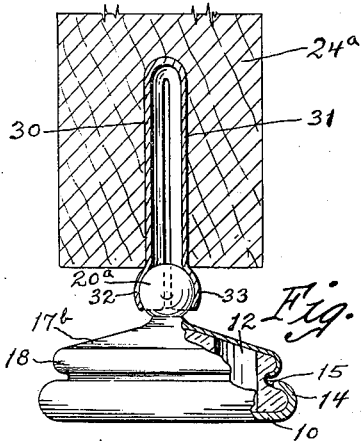
Figure 6 is an elevation, partly in section, showing a further modified form of the pivotal connecting means.
Figure 5:
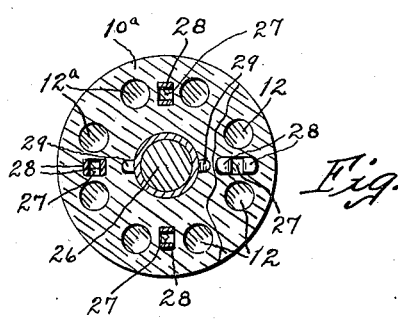
Figure 5 is a horizontal section taken substantially on the line 5—5 of Figure 4.
Figure 7:
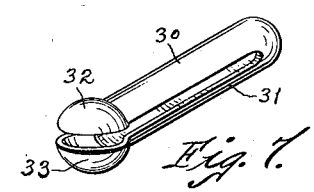
Figure 7 is a perspective view of one of the elements thereof.

In Figures 6 and 7 I have shown a modified form of connecting means, the cushion 10 and shoe 13 being substantially the same as previously described relative to Figures 1 and 2; or if desired as shown in Figures 4 and 5. In this construction the ball 20ª is formed on or fixed to the central portion of the cap 17ᵇ and rises therefrom, the cap being attached to the cushion in any suitable manner as by a peripheral flange 18 engaging in the groove 15 of said cushion. A stem and socket are integrally formed of a single piece of metal by pressing and stamping, the stem being hollow and formed of two substantially semi-cylindrical members 30, 31 attached or connected at their upper ends and yieldingly spaced apart a short distance. Formed on the lower ends of the stem members 30, 31 are mating, substantially semi-spherical socket members 32, 33 adapted to embrace and oscillate on the ball 20ª. The socket members are held in place on the ball when the stem is driven into and compressed by contact with the walls of a cylindrical socket formed in the load object such as 24ª, thus forming the universal pivotal connection between the connecting means and the cushion and shoe.

Figure 8:
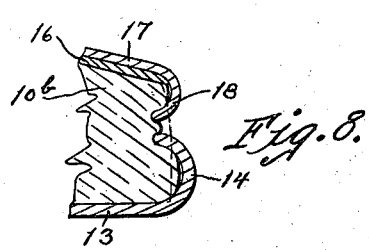
Figure 8 is a detail section illustrating a modification of the cushion member.

A slightly modified form of cushion 10ᵇ is shown in Figure 8, which does not have the peripheral groove before described, nor the peripheral bead or rib 15ª of Figure 4. Instead the normal surface of the cushion is planely cylindrical as illustrated by dotted lines, and when the peripheral flanges 14 of the shoe 13, and 18 of the cap 17, are forcibly turned or pressed inwardly, they compress and form peripheral seats for themselves in the cushion member and are retained thereby.

It is obvious that other modifications, within the scope of the appended claims, may be made without departing from my invention, and that various forms of the different members of the device may be selectively combined in a given article.

I claim as my invention—

1. A glide caster, comprising a cushion member formed with a plurality of vertical apertures, a shoe embracing the lower portion of said member and having a flat lower surface adapted for contact with a floor, a metallic member secured to the upper portion of said cushion member, and attaching means adapted to engage a load object, together with ball-and-socket connections between said attaching means and the metallic member, whereby when the load object is tipped the shoe may remain in flat contact with the floor and the cushion member be compressed in a plane obliquely thereto.

2. A glide caster, comprising a cushion member, a shoe having an upturned peripheral flange embracing the lower marginal portion of said cushion member, a cap member of less diameter than said shoe and having a downturned peripheral flange embracing the upper marginal portion of said cushion member, and means for attaching said cap member to a load object.

3. A glide caster, comprising a unitary cushion member formed with a plurality of apertures extending vertically therethrough, a shoe embracing the lower marginal portion of said cushion member and closing the lower ends of said apertures, a metallic member fixed to the upper portion of said cushion member and closing the upper ends of said apertures, and means including a universal pivotal connection for attaching said metallic member to a load object, whereby when the load object is tipped the shoe may remain in flat contact with a supporting surface and the cushion member be compressed obliquely.

Signed at Merced, in the county of Merced and State of California, this 17th day of March, 1925.

JOHN LOUCIEN CHESNUTT.